United States Patent
Liu et al.

(10) Patent No.: US 10,630,798 B2
(45) Date of Patent: Apr. 21, 2020

(54) ARTIFICIAL INTELLIGENCE BASED METHOD AND APPARATUS FOR PUSHING NEWS

(71) Applicant: BEIJING BAIDU NETCOM SCIENCE AND TECHNOLOGY CO., LTD., Beijing (CN)

(72) Inventors: Hao Liu, Beijing (CN); Kai Liu, Beijing (CN); Yajuan Lyu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 32 days.

(21) Appl. No.: 15/942,276

(22) Filed: Mar. 30, 2018

(65) Prior Publication Data
US 2018/0352043 A1    Dec. 6, 2018

(30) Foreign Application Priority Data
Jun. 2, 2017    (CN) .......................... 2017 1 0408305

(51) Int. Cl.
*H04L 29/08*    (2006.01)
*G06N 5/00*    (2006.01)
*G06N 3/04*    (2006.01)
*G06F 17/27*    (2006.01)

(52) U.S. Cl.
CPC .......... *H04L 67/26* (2013.01); *G06N 3/0445* (2013.01); *G06N 5/003* (2013.01); *G06F 17/2705* (2013.01); *G06F 17/2765* (2013.01); *H04L 67/306* (2013.01)

(58) Field of Classification Search
CPC . G06F 17/2705; G06F 17/2765; G06N 5/003; H04L 67/26
See application file for complete search history.

(56) References Cited

U.S. PATENT DOCUMENTS

| | | | |
|---|---|---|---|
| 9,811,866 B1 * | 11/2017 | Goldman | G06Q 50/01 |
| 2002/0133480 A1 * | 9/2002 | Boguraev | G06F 17/214 |
| 2006/0150087 A1 * | 7/2006 | Cronenberger | G06F 16/338 |
| | | | 715/256 |
| 2011/0252060 A1 * | 10/2011 | Broman | G06F 16/957 |
| | | | 707/771 |
| 2012/0131017 A1 * | 5/2012 | Kato | G06F 16/58 |
| | | | 707/748 |
| 2013/0294746 A1 * | 11/2013 | Oz | H04N 9/87 |
| | | | 386/241 |
| 2014/0067818 A1 * | 3/2014 | Bao | G06F 16/958 |
| | | | 707/740 |

(Continued)

*Primary Examiner* — Shean Tokuta
(74) *Attorney, Agent, or Firm* — Lathrop GPM LLP (57) ABSTRACT

The present disclosure discloses an artificial intelligence based method and apparatus for pushing news. A specific embodiment of the method includes: determining at least one news subject from a news text of to-be-pushed news; extracting, from the news text, text fragments respectively associated with news subjects; generating, for each of the news subjects, a subject tag based on the extracted text fragment through a deep learning method; and pushing the to-be-pushed news based on the at least one news subject and the generated subject tag. This embodiment may improve the effectiveness of news pushing.

11 Claims, 6 Drawing Sheets

(56) References Cited

U.S. PATENT DOCUMENTS

| | | | |
|---|---|---|---|
| 2015/0375117 A1* | 12/2015 | Thompson | A63F 13/35 463/9 |
| 2016/0012818 A1* | 1/2016 | Faizakof | G06F 17/2755 704/245 |
| 2016/0188590 A1* | 6/2016 | Cole | G06F 16/9537 707/747 |
| 2016/0359791 A1* | 12/2016 | Zhang | H04L 51/32 |
| 2017/0072321 A1* | 3/2017 | Thompson | H04N 21/23424 |
| 2019/0191200 A1* | 6/2019 | Panchaksharaiah | H04N 21/4622 |

* cited by examiner

ARTIFICIAL INTELLIGENCE BASED METHOD AND APPARATUS FOR PUSHING NEWS

CROSS-REFERENCE TO RELATED APPLICATIONS

This application is related to and claims priority from Chinese patent application no. 201710408305.X, filed with the state intellectual property office (SIPO) of the People's Republic of China on Jun. 2, 2017, the entire disclosure of the Chinese patent application is hereby incorporated by reference.

TECHNICAL FIELD

The present application relates to the field of computer technology, specifically to the field of Internet technology, and more specifically to an artificial intelligence based method and apparatus for pushing news.

BACKGROUND

Push, is a technology which reduces information overload by providing users with the information they need on the Internet through certain technical standards or protocols. Here, the information pushing technology may reduce the amount of time the users spent searching on the Internet, by proactively pushing information to the users. In the existing news pushing process, only the news content is pushed to the users. For the news subjects involved in the news content, such as entities (for example, people, objects, buildings, attractions), events and topics, it is necessary for the readers to read the news carefully to have a judgment as to the emotional tendency. If the readers do not have the truth, or an incomplete knowledge of the truth, they are either easily assimilated by the emotional coloring of the author, or need to spend more time to figure out the truth of the news. Therefore, the effectiveness of news pushing needs to be improved.

Artificial Intelligence, abbreviated as AI, is a technological science which researches on and develops theories, methods, techniques and application systems for simulating, extending and expanding human intelligence. As a branch of the computer science, artificial intelligence attempts to learn the principle of intelligence and produce a novel intelligent machine capable of making response in a way similar to human intelligence. The researches in this field include robot, language recognition, image recognition, natural language processing and expert systems, etc. Therefore, artificial intelligence may be applied to the emotional tendency analyzing in the news pushing to improve the effectiveness of the information pushing.

SUMMARY

The objective of the present disclosure is to provide an improved artificial intelligence based method and apparatus for pushing news, in order to solve the technical problem mentioned in the foregoing Background section.

In a first aspect, the present disclosure provides an artificial intelligence based method for pushing news, the method including: determining at least one news subject from a news text of to-be-pushed news; extracting, from the news text, text fragments respectively associated with news subjects; generating, for each of the news subjects, a subject tag based on the extracted text fragment through a deep learning method; and pushing the to-be-pushed news based on the at least one news subject and the generated subject tag.

In some embodiments, the determining at least one news subject from a news text of to-be-pushed news includes: matching the news text with a preset subject keyword; and determining at least one news subject based on the matched subject keyword.

In some embodiments, the extracting, from the news text, text fragments respectively associated with news subjects includes: for the each of the news subjects, matching clauses in the news text respectively with the news subject; and extracting a matched clause as a text fragment associated with the news subject.

In some embodiments, the extracting, from the news text, text fragments respectively associated with news subjects further includes: for a clause not matched with the news subject in the news text, determining whether the clause contains a pronoun; if yes, determining the news subject corresponding to the pronoun using anaphora resolution and extracting the clause as the text fragment associated with the news subject corresponding to the contained pronoun.

In some embodiments, the pushing the to-be-pushed news based on the at least one news subject and the generated subject tag includes: generating a page for news pushing by uniting the subject tag of the at least one news subject and the news text of the to-be-pushed news.

In some embodiments, the pushing the to-be-pushed news based on the at least one news subject and the generated subject tag includes: matching a personalized tag of a user with the at least one news subject; and pushing the to-be-pushed news to the user, in response to matching at least one of the at least one news subject with the personalized tag of the user; wherein the personalized tag is generated through a following method: acquiring an article posted by the user; and determining an article subject from the article posted by the user as the personalized tag.

In a second aspect, the present disclosure further provides an artificial intelligence based apparatus for pushing news, the apparatus including: a determination module, configured for determining at least one news subject from a news text of to-be-pushed news; an extraction module, configured for extracting, from the news text, text fragments respectively associated with news subjects; a generation module, configured for generating, for each of the news subjects, a subject tag based on the extracted text fragment through a deep learning method; and a push module, configured for pushing the to-be-pushed news based on the at least one news subject and the generated subject tag.

In some embodiments, the determination module includes: a match unit, configured for matching the news text with a preset subject keyword; and a determination unit, configured for determining at least one news subject based on the matched subject keyword.

In some embodiments, the extraction module is further configured for: for the each of the news subjects, matching clauses in the news text respectively with the news subject; and extracting a matched clause as a text fragment associated with the news subject.

In some embodiments, the extraction module is further configured for: for a clause not matched with the news subject in the news text, determining whether the clause contains a pronoun; if yes, determining the news subject corresponding to the pronoun using anaphora resolution and extracting the clause as the text fragment associated with the news subject corresponding to the contained pronoun.

In some embodiments, the push module is further configured for: generating a page for news pushing by uniting the subject tag of the at least one news subject and the news text of the to-be-pushed news.

In some embodiments, the push module is further configured for: matching a personalized tag of a user with the at least one news subject; and pushing the to-be-pushed news to the user, in response to matching at least one of the at least one news subject with the personalized tag of the user; wherein the personalized tag is generated through a following method: acquiring an article posted by the user; and determining an article subject from the article posted by the user as the personalized tag.

In a third aspect, the present disclosure further provides a computing device, including: one or more processors; a storage apparatus, to store one or more programs; and when the one or more programs being executed by the one or more processors, cause the one or more processors to implement the above method.

The artificial intelligence based method and apparatus for pushing news provided by the present disclosure determine at least one news subject from a news text of to-be-pushed news; extract, from the news text, text fragments respectively associated with news subjects; generate, for each of the news subjects, a subject tag based on the extracted text fragment through a deep learning method; and push the to-be-pushed news based on the at least one news subject and the generated subject tag. Since the news pushing is based on the news subject and the subject tag determined from the news text, it may directly express descriptive features of the news subject or an emotional tendency of the author or reader to the news subject, thereby improving the effectiveness of the news pushing.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
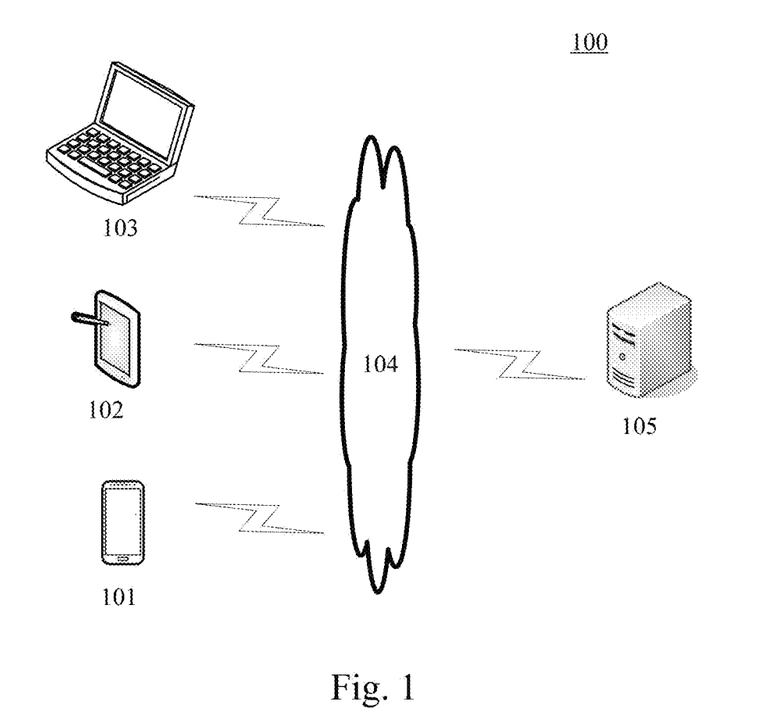
FIG. 1 is an exemplary system architecture diagram in which the present disclosure may be applied.

FIG. 1 shows an illustrative architecture of a system 100, which may be used by an artificial intelligence based method for pushing news or an artificial intelligence based apparatus for pushing news according to the embodiments of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various communication client applications, such as browser applications, search applications, news pushing applications, shopping applications, instant messaging tools, mailbox clients, and social platform software may be installed on the terminal devices 101, 102 and 103.

The terminal devices 101, 102 and 103 may be various electronic devices having a display, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server that provides various services, for example, a backend server that provides support for browser applications, search applications, news pushing applications, etc. on the terminal devices 101, 102, 103. The server 105 may perform processing such as analyzing on the received data, and feedback the processing result (for example, pushed news) to the terminal devices.

It needs to be noted that the artificial intelligence based method for pushing news provided by the present disclosure is generally executed by the server 105, or may be executed by the terminal devices 101, 102 and 103. Accordingly, the artificial intelligence based apparatus for pushing news is generally provided in the server 105, or may be provided in the terminal devices 101, 102 and 103.

It should be understood that the numbers of the terminal devices, the networks and the servers in FIG. 1 are merely illustrative. Any number of terminal devices, networks and servers may be provided based on the implementation requirements.

Figure 2:
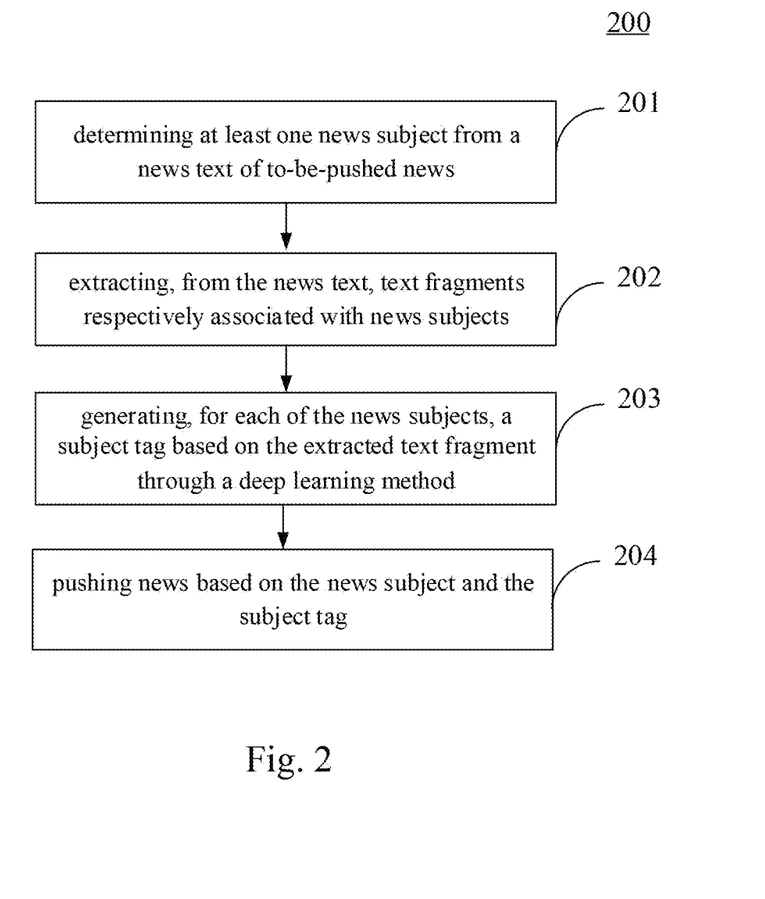
FIG. 2 is a flowchart of an embodiment of an artificial intelligence based method for pushing news according to the present disclosure.

With further reference to FIG. 2, a flow 200 of an embodiment of the artificial intelligence based method for pushing news according to the present disclosure is shown. The artificial intelligence based method for pushing news includes the following steps:

Step 201, determining at least one news subject from a news text of to-be-pushed news.

In the present embodiment, the electronic device (e.g., the server 105 as shown in FIG. 1) on which the artificial intelligence based method for pushing news runs may firstly determine the subject contained in the news from the news text of the to-be-pushed news. Here, the subject contained in the news may be, for example, an entity (such as a person, an object, a building, an attraction), an event, a topic, etc. It may be understood that there may be one or more news subjects in apiece of to-be-pushed news. For example, in the sports competition news, the news subject involves at least the two parties participating in the competition.

Typically, the to-be-pushed news may at least include the news text, and may also include but not limited to at least one of the following: a picture, an audio, a video, or the like. When the to-be-pushed news includes at least one of a picture, an audio, a video, or the like, it may correspondingly contain a corresponding description text, and the electronic device may use the description text as apart of the news text. In practice, the electronic device may determine the news subject according to any reasonable method, for example, determine the news subject from the news headline, or determine the news subject based on statistics of subjects of the first sentences of paragraphs or the last sentences of paragraphs in the news text. For example, the news headline is "NBA Live streaming: Spurs VS Rockets," and the electronic device may acquire the nouns "NBA," "Spurs" and "Rockets" as the news subjects. In some implementations, the electronic device may also preset a set of subject keywords, match the news text with the preset subject keywords, and determine the news subject based on the matched subject keywords. For example, the electronic device may determine all the matched subject keywords respectively as the news subjects, and may select the subject keyword with the maximum times of match as the news subject. Here, match of the subject keyword with the news text may be an exact match, or may be an extended match, for example, the match of a synonym, or a near-synonym of the subject keyword with the news text. For example, the subject keyword includes a name "XX Gang," the person corresponding to the name also has a nickname such as "Gangzi." The match of the nickname "Gangzi" with the news text may be taken as the extended match of the subject keyword "XX Gang" with the news text, and the electronic device is considered to have matched the subject keyword "XX Gang" when it matched "Gangzi" in the news text.

Step 202, extracting, from the news text, text fragments respectively associated with news subjects.

In the present embodiment, the electronic device (e.g., the server 105 as shown in FIG. 1) on which the artificial intelligence based method for pushing news runs may then extract, from the news text, text fragments respectively associated with the news subjects, based on the determined news subject. Here, the text fragment may be a paragraph, a sentence, a clause in a long sentence, a word in a sentence, or any combination of the above, which is not limited in the present disclosure. It may be understood that descriptions related to the news subject in the news text may all be used as the text fragments associated with the news subject.

In practice, in some implementations, the electronic device may match the news subject with the news text in a "paragraph-sentence-clause" precedence. For example, the number of news subjects appearing in a paragraph is determined, if there is only one news subject, the whole paragraph is regarded as the text fragment associated with the news subject, and if there are multiple news subjects, the number of the news subjects contained in each sentence of the paragraph is determined sentence by sentence. Similarly, if there is only one news subject in the sentence, the whole sentence is regarded as the text fragment associated with the news subject, and if there are multiple news subjects in the sentence, the news subjects contained in each clause of the sentence are determined. In some other implementations, the electronic device may also directly determine the clauses in the news text as the text fragments, to match them respectively with the determined news subject, and extract the matched clauses as the text fragments associated with the news subject. The present disclosure does not impose any limitations thereof.

It may be understood that not all clauses in the news text contain a subject or a news subject, such as "She stood up and walked to the window, looked at those tall buildings." For a clause that does not match a news subject, the electronic device may determine whether a pronoun (e.g., he, she, it) is contained; if yes, the news subject corresponding to the pronoun may be determined using anaphora resolution, and the clause is determined as the text fragment associated with the news subject corresponding to the contained pronoun. Otherwise, the news subject corresponding to the text fragment may be determined by a previous text retrospection method, such as the news subject associated with the subject "She" corresponding to "walked to the window" and "looked at those tall buildings." Here, the anaphora resolution refers to a technology used in the information extraction process of the natural language processing, which may be used to solve the problem of determining which noun phrase the pronoun is referring to in the chapter, detailed description thereof is omitted.

Step 203, generating, for each of the news subjects, a subject tag based on the extracted text fragment through a deep learning method.

In the present embodiment, the electronic device (e.g., the server 105 as shown in FIG. 1) on which the artificial intelligence based method for pushing news runs may further generate, for each of the news subjects, a subject tag of the news subject based on the extracted text fragment through a deep learning method. Here, the subject tag may be a word or a phrase, which may be used to describe the feature of the news subject, such as basketball, music, and may express an emotional coloring of the author or the reader to the news subject, such as like, disgust.

In the present embodiment, the electronic device may train a deep learning model in advance through a certain number of natural language samples, to classify the text fragments, wherein the classified categories are the subject tags. The deep learning model may be, for example, a Recurrent Neural Network (RNN), a Long Short-Term Memory (LSTM), detailed description thereof is omitted. It may be understood that there may be one or more subject tags, which is not limited in the present disclosure. In practice, the electronic device may determine the subject tag according to a probability on each category after the classification with the deep learning model. For example, the electronic device may order the probability on each category from high to low, select a preset number of categories ordered at front as the subject tags, or may select one or more categories with probabilities greater than a preset probability threshold as the subject tag.

Step 204, pushing news based on the news subject and the subject tag.

In the present embodiment, the electronic device (e.g., the server 105 as shown in FIG. 1) on which the artificial intelligence based method for pushing news runs may further push news based on the determined news subject and the subject tag corresponding to the news subject.

In some alternative implementations of the present embodiment, the electronic device may generate a page by uniting the subject tag and the news text and push the page to the user. In practice, the electronic device may choose different push methods depending on the varied numbers of news subjects. For example, when there is only one news subject in the news text, the electronic device may push with the one or more subject tags arranged on a predetermined position of the news page. When there is only one news subject in the news text, the electronic device may push with the subject tags marked at predetermined positions respectively.

Figure 3A:
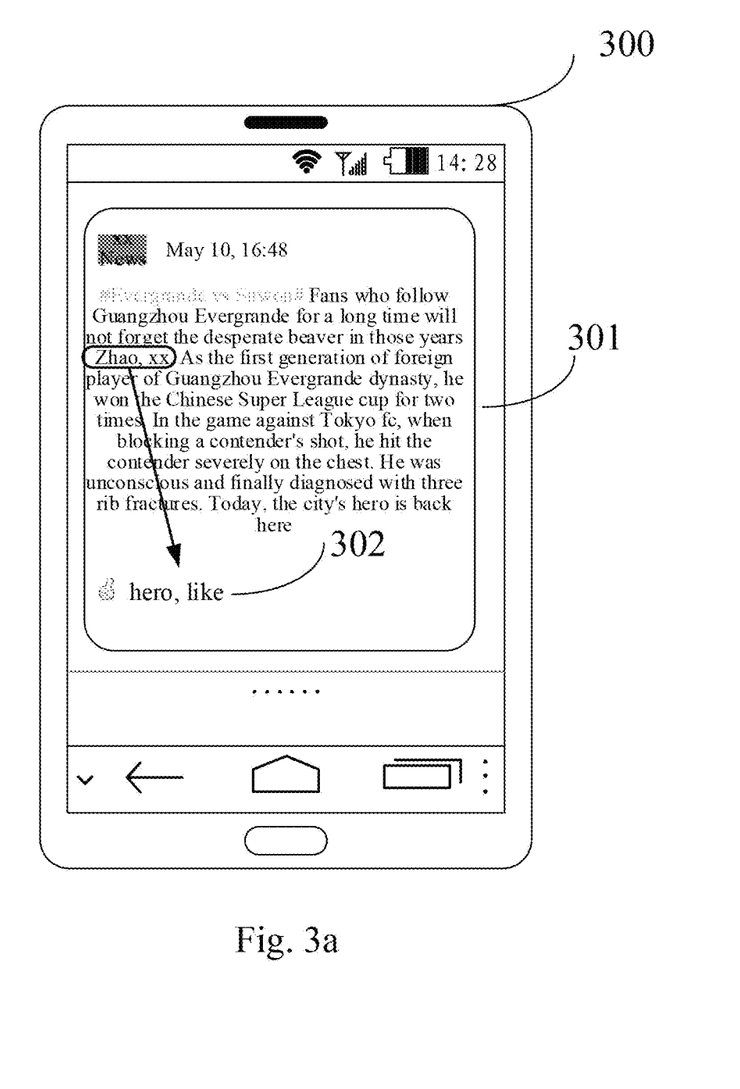
FIG. 3a and FIG. 3b are schematic diagrams of application scenarios of an embodiment of the artificial intelligence based method for pushing news according to the present disclosure.
Figure 3B:
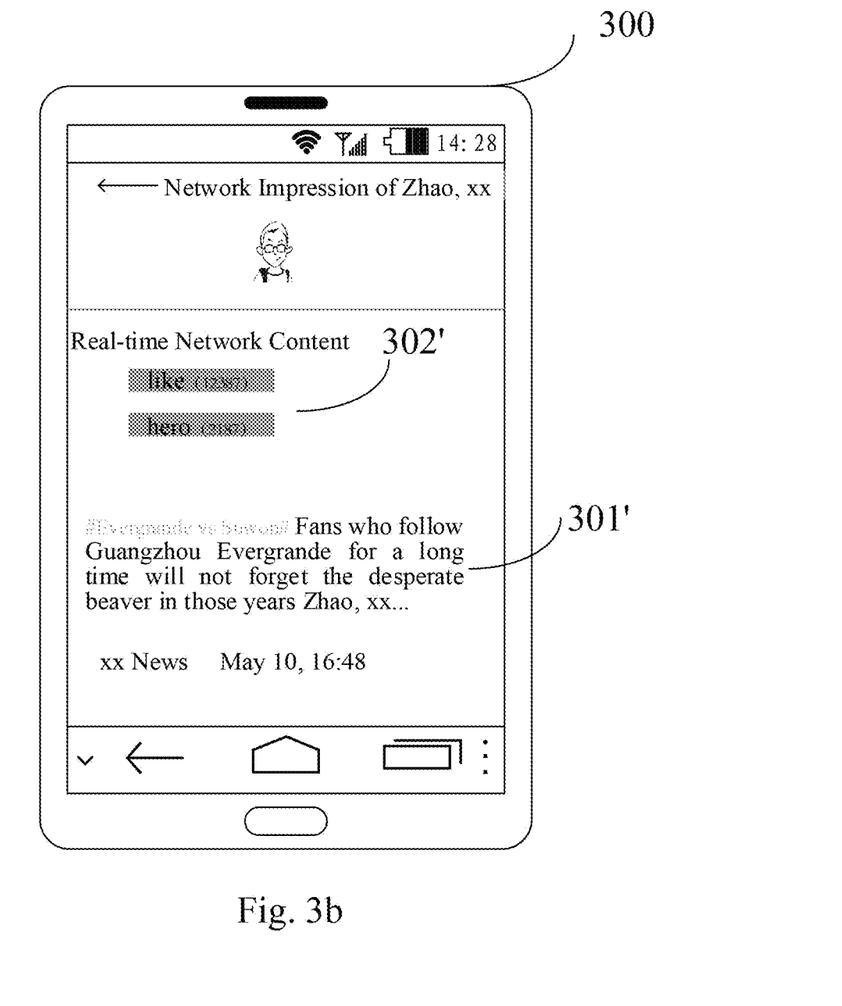

As an application scenario, the artificial intelligence based method for pushing news provided by the present disclosure may be applied to a backend server that provides support for news pushing applications. Each time a to-be-pushed news is acquired, the backend server may: acquire a news text of the to-be-pushed news, determine a news subject from the news text according to a preset subject keyword; next, extract a text fragment associated with the determined news subject in the news text; then, generate a subject tag based on the extracted text fragment through a deep learning method; next, as shown in FIG. 3a and FIG. 3b, based on the determined news subject and subject tag, push the news to the terminal 300 on which the above news pushing application runs. In order to illustrate the effect achieved by the present disclosure more directly, reference is made to FIG. 3a and FIG. 3b. FIG. 3a and FIG. 3b show two different pushing scenarios. As shown in FIG. 3a, in the pushed news 301, the news subject includes "Zhao XX," and the subject tag 302 generated by the backend server to the news subject includes a thumb-up figure and the words "Hero, Like." The backend server generates a page by uniting the subject tag 302 and the content of the news 301 and push the page to the terminal 300. As shown in FIG. 3b, on the page searching for "Zhao XX," the subject tag 302' about the news subject "Zhao XX" generated by the backend server based on the news text and the pushed news 301' are included.

Therefore, since the artificial intelligence based method for pushing news of the present embodiment pushes news based on the news subject and the subject tag determined from the news text, it may directly express descriptive features of the news subject or an emotional tendency of the author or reader to the news subject, thereby improving the effectiveness of news pushing.

Figure 4:
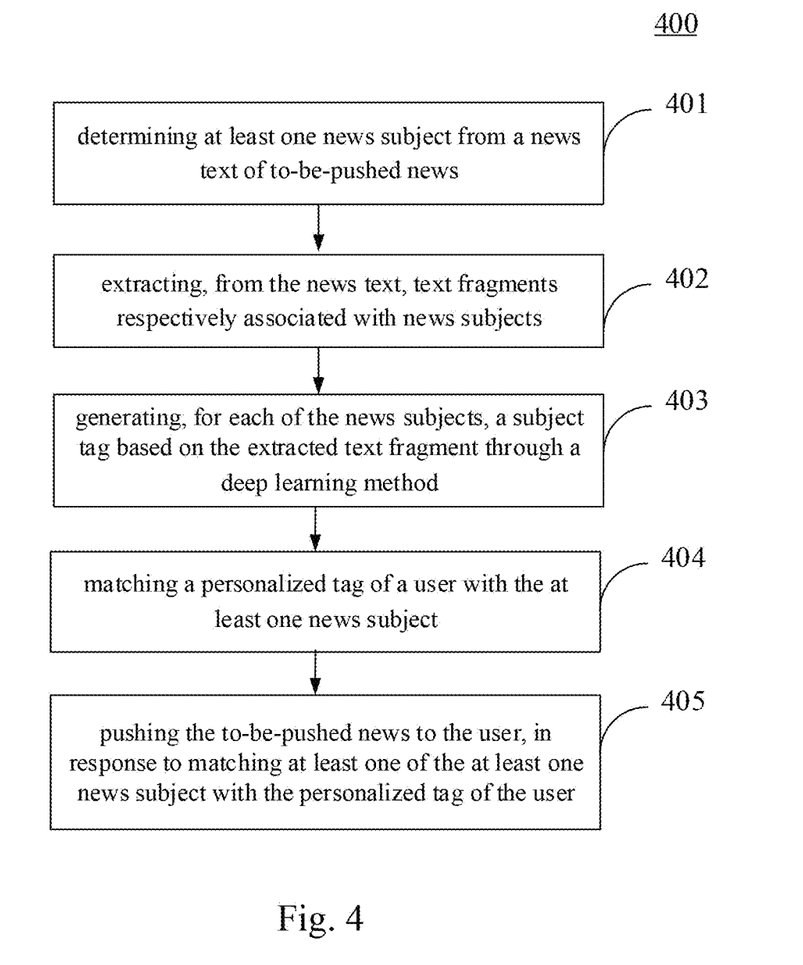
FIG. 4 is a flowchart of another embodiment of the artificial intelligence based method for pushing news according to the present disclosure.

With further reference to FIG. 4, a flow 400 of another embodiment of the artificial intelligence based method for pushing news according to the present disclosure is illustrated. The artificial intelligence based method for pushing news includes the following steps:

Step 401, determining at least one news subject from a news text of to-be-pushed news.

In the present embodiment, the electronic device (e.g., the server 105 as shown in FIG. 1) on which the artificial intelligence based method for pushing news runs may firstly determine the subject contained in the news from the news text of the to-be-pushed news. Here, the subject contained in the news may be, for example, an entity (such as a person, an object, a building, an attraction), an event, a topic. It may be understood that there may be one or more news subjects in apiece of to-be-pushed news. In some implementations, the electronic device may also preset a set of subject keywords, match the news text with the preset subject keywords, and determine the news subject based on the matched subject keywords.

Step 402, extracting, from the news text, text fragments respectively associated with news subjects.

In the present embodiment, the electronic device (e.g., the server 105 as shown in FIG. 1) on which the artificial intelligence based method for pushing news runs may then extract, from the news text, text fragments respectively associated with news subjects, based on the determined news subject. Here, the text fragment may be a paragraph, a sentence, a clause in a long sentence, a word in a sentence, or any combination of the above, which is not limited in the present disclosure. It may be understood that descriptions related to the news subject in the news text may all be used as the text fragments associated with the news subject.

Step 403, generating, for each of the news subjects, a subject tag based on the extracted text fragment through a deep learning method.

In the present embodiment, the electronic device (e.g., the server 105 as shown in FIG. 1) on which the artificial intelligence based method for pushing news runs may further generate, for each of the news subjects, a subject tag of the news subject based on the extracted text fragment through a deep learning method such as RNN and LSTM. Here, the subject tag may be a word or a phrase, which may be used to describe a feature of the news subject, such as basketball, music, or may also express an emotional coloring of the author or the reader to the news subject, such as like, disgust.

Step 404, matching a personalized tag of a user with the at least one news subject.

In the present embodiment, the electronic device (e.g., the server 105 as shown in FIG. 1) on which the artificial intelligence based method for pushing news runs may further acquire a personalized tag of at least one user and match the acquired personalized tag of each user respectively with the determined at least one news subject.

Here, the personalized tag of the user may be used to express the user's preferences and concerned matters. The personalized tag of the user may be stored in the electronic device in advance, or may be generated by the electronic device in real time, or may be acquired by the electronic device from other electronic devices for generating the personalized tag of the user (for example, a terminal device held by the user), which is not limited in the present disclosure. The personalized tag of the user may be manually set by the user, or may be extracted based on historical behavior records (such as historical accessing records, historical searching records). In some implementations, the personalized tag of the user may be generated through the following method: acquiring an article posted by the user; and determining an article subject from the article posted by the user as the personalized tag. Here, the article posted by the user may be an article posted by the user through at least one of the following websites that include but not limited to: Weibo, journals, forums, etc. The method for determining an article subject is similar to the method for determining a news subject, and detailed description thereof is omitted.

During the process of matching the personalized tag of the user with the at least one news subject of the to-be-pushed news, since the descriptions of the subject included by the personalized tag and the news subject may be different, in the matching process, the personalized tag and the news subject may be respectively extended to the matching of synonyms and near-synonyms. When the personalized tag and one of its synonyms and near-synonyms is matched with the news subject and one of its synonyms and near-synonyms, it may be determined that the personalized tag of the user matches with the news subject.

Step 405, pushing the to-be-pushed news to the user, in response to matching at least one of the at least one news subject with the personalized tag of the user.

In the present embodiment, in response to matching at least one of the at least one news subject with the personalized tag of the user, the electronic device (e.g., the server 105 as shown in FIG. 1) on which the artificial intelligence based method for pushing news runs may push the to-be-pushed news to the user corresponding to the personalized tag.

As can be seen from FIG. 4, compared with the corresponding embodiment in FIG. 2, the flow 400 of the artificial intelligence based method for pushing information in the present embodiment highlights the step of pushing news based on the personalized tag of the user. Therefore, the solution described by the present embodiment may achieve a targeted artificial intelligence based news pushing in combination with personalized features of the user.

Figure 5:
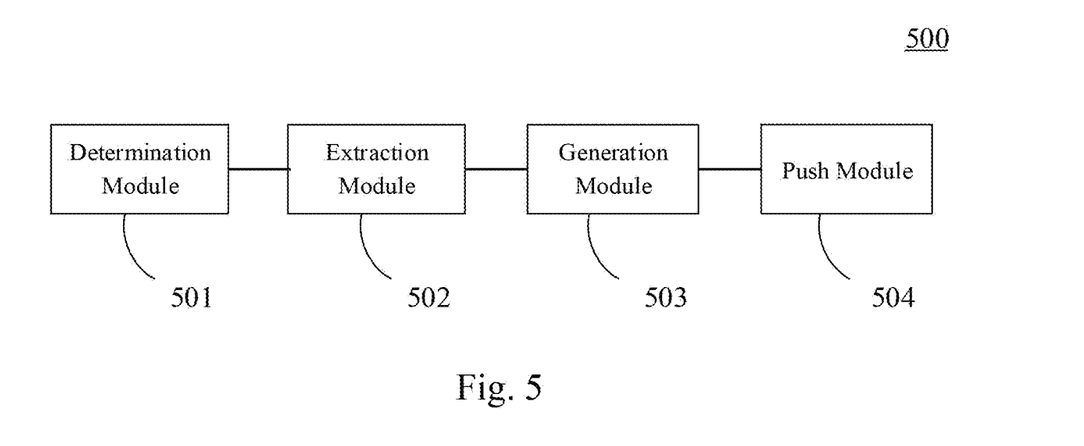
FIG. 5 is a schematic structural diagram of an embodiment of an artificial intelligence based apparatus for pushing news according to the present disclosure.

With further reference to FIG. 5, as an implementation to the artificial intelligence based method for pushing news, the present disclosure provides an embodiment of an artificial intelligence based apparatus for pushing news. The apparatus embodiment corresponds to the method embodiment shown in FIG. 2.

As shown in FIG. 5, the artificial intelligence based apparatus 500 for pushing news of the present embodiment includes: a determination module 501, an extraction module 502, a generation module 503 and a push module 504. Here, the determination module 501 may be configured for determining at least one news subject from a news text of to-be-pushed news. The extraction module 502 may be configured for extracting, from the news text, text fragments respectively associated with news subjects. The generation module 503 may be configured for generating, for each of the news subjects, a subject tag based on the extracted text fragment through a deep learning method. The push module 504 may be configured for pushing the to-be-pushed news based on the at least one news subject and the generated subject tag.

In some alternative implementations of the present embodiment, the determination module 501 may include: a match unit (not shown), which may be configured for matching the news text with a preset subject keyword; and a determination unit (not shown), which may be configured for determining at least one news subject based on the matched subject keyword.

In some alternative implementations of the present embodiment, the extraction module 502 is further configured for: for each of the news subjects, matching each clause in the news text respectively with the news subject; and extracting a matched clause as a text fragment associated with the news subject.

In some other alternative implementations of the present embodiment, the extraction module 502 is further configured for: for a clause not matched with the news subject in the news text, determining whether the clause contains a pronoun; and if yes, determining the news subject corresponding to the pronoun using anaphora resolution and extracting the clause as the text fragment associated with the news subject corresponding to the contained pronoun.

In some alternative implementations of the present embodiment, the push module 504 is further configured for: generating a page for news pushing by uniting the subject tag of the at least one news subject and the news text of the to-be-pushed news.

In some alternative implementations of the present embodiment, the push module 504 is further configured for: matching a personalized tag of a user with the at least one news subject; and pushing the to-be-pushed news to the user, in response to matching at least one of the at least one news subject with the personalized tag of the user; wherein the personalized tag is generated through a following method: acquiring an article posted by the user; and determining an article subject from the article posted by the user as the personalized tag.

It should be noted that the modules recorded in the artificial intelligence based apparatus 500 for pushing news correspond to the steps in the method described with reference to FIG. 2. Therefore, the operations and features described above with respect to the method are also applicable to the apparatus 500 and the modules or units included therein, and detailed description thereof will be omitted.

It may be understood by those skilled in the art that the artificial intelligence based apparatus 500 for pushing news further includes some other well-known structures such as a processor, a memory. In order not to unnecessarily obscure the embodiments of the present disclosure, these well-known structures are not shown in FIG. 5.

Figure 6:
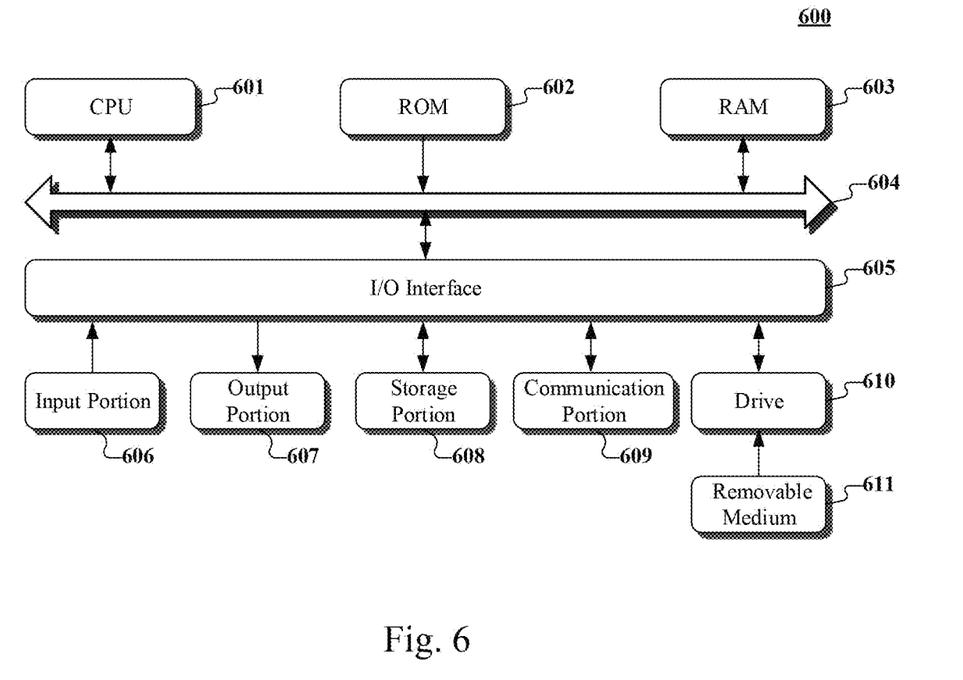
FIG. 6 is a schematic structural diagram of a computer system adapted to implement a terminal device or a server of embodiments of the present disclosure.

With reference to FIG. 6, a schematic structural diagram of a computer system 600 adapted to implement a terminal device/server of the embodiments of the present disclosure is illustrated. The terminal device/server shown in FIG. 6 is merely an example and should not impose any restriction on the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 including a network interface card, such as a LAN card and a modem. The communication portion 609 performs communication processes via a network, such as the Internet. A drive 610 is also connected to the I/O interface 605 as required. A removable medium 611, such as a magnetic disk, an optical disk, a magneto-optical disk, and a semiconductor memory, may be installed on the drive 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, including a determination module, an extraction module, a generation module and a push module, where the names of these units or modules do not in some cases constitute a limitation to such units or modules themselves. For example, the determination module may also be described as "a module for determining at least one news subject from a news text of to-be-pushed news."

In another aspect, the present application further provides a non-volatile computer-readable storage medium. The non-volatile computer-readable storage medium may be the non-volatile computer-readable storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to: determine at least one news subject from a news text of to-be-pushed news; extract, from the news text, text fragments respectively associated with news subjects; generate, for each of the news subjects, a subject tag based on the extracted text fragment through a deep learning method; and push the to-be-pushed news based on the at least one news subject and the generated subject tag.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. An artificial intelligence based method for pushing news, the method comprising:
    determining at least one news subject from a news text of to-be-pushed news;
    extracting, from the news text, text fragments respectively associated with news subjects;
    generating, for each of the news subjects, a subject tag based on the extracted text fragment through a deep learning method; and
    pushing the to-be-pushed news based on the at least one news subject and the generated subject tag,
    wherein the extracting, from the news text, text fragments respectively associated with news subjects comprises:
    for the each of the news subjects,
    matching clauses in the news text respectively with the news subject;
    for a clause not matched with the news subject in the news text, determining whether the clause contains a pronoun; and
    when the clause contains a pronoun, determining the news subject corresponding to the pronoun using anaphora resolution and extracting the clause as the text fragment associated with the news subject corresponding to the contained pronoun.

2. The method according to claim 1, wherein the determining at least one news subject from a news text of to-be-pushed news comprises:
    matching the news text with a preset subject keyword; and
    determining at least one news subject based on the matched subject keyword.

3. The method according to claim 1, wherein the extracting, from the news text, text fragments respectively associated with news subjects comprises:
    extracting a matched clause as a text fragment associated with the news subject.

4. The method according to claim 1, wherein the pushing the to-be-pushed news based on the at least one news subject and the generated subject tag comprises:
    generating a page for news pushing by uniting the subject tag of the at least one news subject and the news text of the to-be-pushed news.

5. The method according to claim 1, wherein the pushing the to-be-pushed news based on the at least one news subject and the generated subject tag comprises:
    matching a personalized tag of a user with the at least one news subject; and
    pushing the to-be-pushed news to the user, in response to matching at least one of the at least one news subject with the personalized tag of the user;

wherein the personalized tag is generated through a following method: acquiring an article posted by the user; and determining an article subject from the article posted by the user as the personalized tag.

6. An artificial intelligence based apparatus for pushing news, the apparatus comprising:

at least one processor; and a memory storing instructions, the instructions when executed by the at least one processor, cause the at least one processor to perform operations, the operations comprising:

determining at least one news subject from a news text of to-be-pushed news;

extracting, from the news text, text fragments respectively associated with news subjects;

generating, for each of the news subjects, a subject tag based on the extracted text fragment through a deep learning method; and pushing the to-be-pushed news based on the at least one news subject and the generated subject tag, wherein the extracting, from the news text, text fragments respectively associated with news subjects comprises:

for the each of the news subjects, matching clauses in the news text respectively with the news subject;

for a clause not matched with the news subject in the news text, determining whether the clause contains a pronoun; and when the clause contains a pronoun, determining the news subject corresponding to the pronoun using anaphora resolution and extracting the clause as the text fragment associated with the news subject corresponding to the contained pronoun.

7. The apparatus according to claim 6, wherein the determining at least one news subject from a news text of to-be-pushed news comprises:

matching the news text with a preset subject keyword; and determining at least one news subject based on the matched subject keyword.

8. The apparatus according to claim 6, wherein the extracting, from the news text, text fragments respectively associated with news subjects comprises:

extracting a matched clause as a text fragment associated with the news subject.

9. The apparatus according to claim 6, wherein the pushing the to-be-pushed news based on the at least one news subject and the generated subject tag comprises:

generating a page for news pushing by uniting the subject tag of the at least one news subject and the news text of the to-be-pushed news.

10. The apparatus according to claim 6, wherein the pushing the to-be-pushed news based on the at least one news subject and the generated subject tag comprises:

matching a personalized tag of a user with the at least one news subject; and pushing the to-be-pushed news to the user, in response to matching at least one of the at least one news subject with the personalized tag of the user;

wherein the personalized tag is generated through a following method: acquiring an article posted by the user; and determining an article subject from the article posted by the user as the personalized tag.

11. A non-transitory computer storage medium storing a computer program, the computer program when executed by one or more processors, causes the one or more processors to perform operations, the operations comprising:

determining at least one news subject from a news text of to-be-pushed news;

extracting, from the news text, text fragments respectively associated with news subjects;

generating, for each of the news subjects, a subject tag based on the extracted text fragment through a deep learning method; and pushing the to-be-pushed news based on the at least one news subject and the generated subject tag, wherein the extracting, from the news text, text fragments respectively associated with news subjects comprises:

for the each of the news subjects, matching clauses in the news text respectively with the news subject;

for a clause not matched with the news subject in the news text, determining whether the clause contains a pronoun; and when the clause contains a pronoun, determining the news subject corresponding to the pronoun using anaphora resolution and extracting the clause as the text fragment associated with the news subject corresponding to the contained pronoun.

* * * * *